Patented Oct. 26, 1937

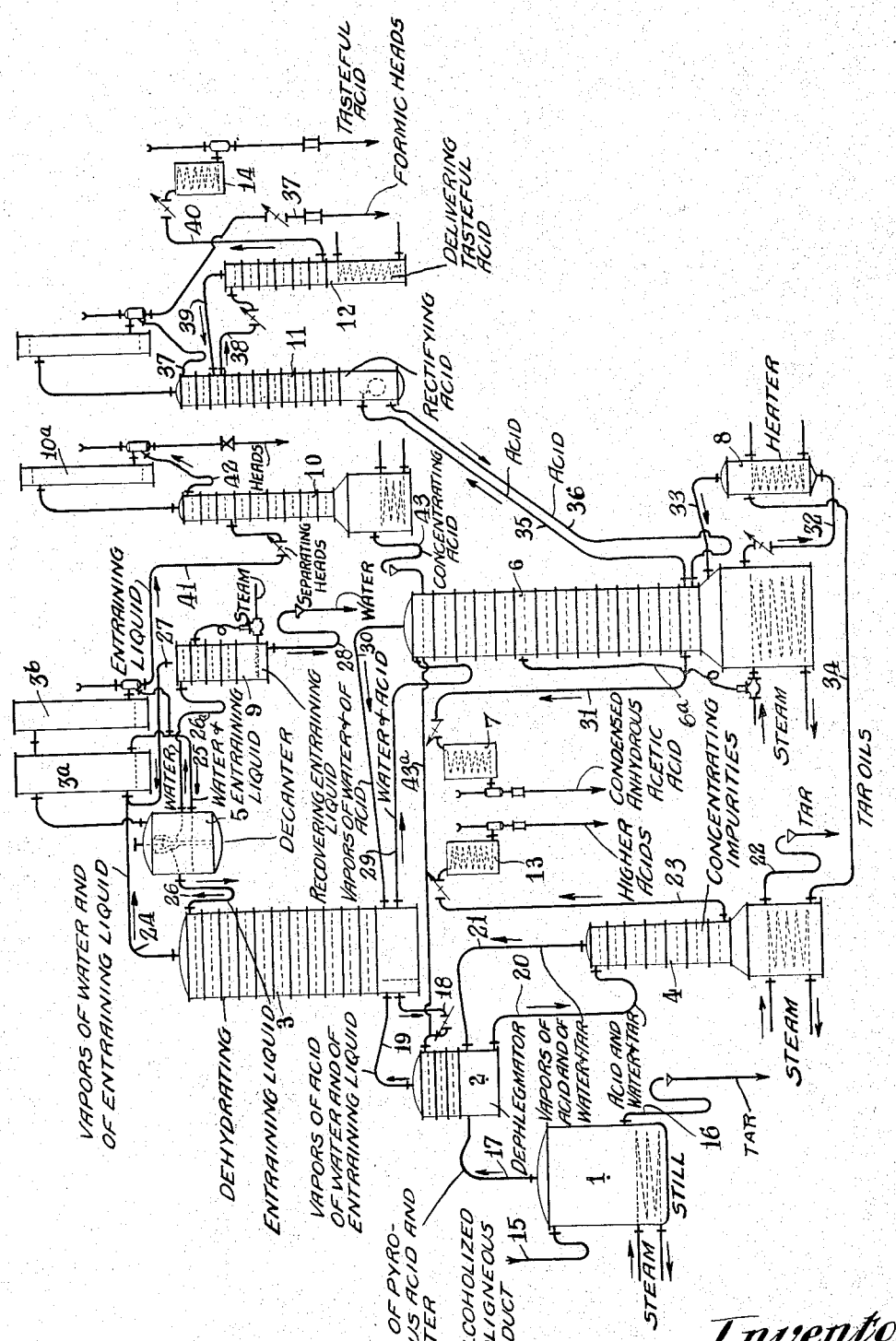

2,096,734

UNITED STATES PATENT OFFICE 2,096,734

PROCESS FOR CONCENTRATING AND PURIFYING ACETIC ACID FROM PYROLIGNEOUS PRODUCTS

Charles Coutor, Premery, France, assignor to Société Etablissements Lambiotte Freres, Premery, France Application May 18, 1934, Serial No. 726,395
In France September 7, 1933

6 Claims. (Cl. 202—42)

It is well known to concentrate aqueous solutions of acetic acid by distillation in the presence of auxiliary substances: Marckwald in the year 1904 used xylol (D. R. P. No. 172,931); Evence Coppee uses toluol, ethers, ketones (F. P. Nos. 558,875 and 565,265) and ever since a great many methods were proposed which employ certain ethers, ketones, wood oils and generally oxygen-containing substances. All these methods, which apply satisfactorily to simple aqueous acetic acid solutions, entail serious disadvantages when acid from pyroligneous acid is treated, as the latter, even after distillation, contains considerable amounts of more or less volatile impurities which become concentrated with the acetic acid, a raw acid thus being obtained which is highly impure and the purification of which is very difficult and costly.

The object of this invention is a method which is more advantageous than those already known and according to which the acetic acid from pyroligneous acid is purified and concentrated at the same time by the action of entraining or withdrawing substances, which generally consist of a mixture of an oxygen-containing substance and a hydrocarbon, for reasons of efficiency.

For instance, the mixture of butyl acetate and xylol, containing 20 to 50% xylol, may be used; such a mixture is a good solvent for acetic acid and the oils in the pyroligneous acid and also forms with water an azeotropic mixture having a minimum boiling point.

An embodiment of the method comprising my invention, as well as an apparatus for carrying it into practice, is diagrammatically illustrated by way of example in the drawing forming a part of the specification.

The de-alcoholized pyroligneous acid is introduced through a pipe 15 into a still 1 which is heated by a steam coil. The acid may be de-alcoholized by any known method. A portion of the tar contained in the pyroligneous acid, not being volatile at the temperature normally employed in vaporizing acetic acid, flows through the pipe 16 while the vapors of the pyroligneous acid flow through the pipe 17 and enter the dephlegmator 2. The pyroligneous acid vapor, as is well known, contains water and fatty acids along with wood oils and tar. The dephlegmator or column 2 receives at the top through the pipe 18 a controlled stream or reflux of entraining liquid which has been decanted at the bottom of the column 3, as will be described in more detail later. The dephlegmator 2 functions to purify the vapors of the pyroligneous acid by condensing the tar, wood oils and higher acids so that the product issuing from the dephlegmator 2 through the pipe 19 and entering the bottom of the column 3 is essentially only a mixture of water vapor, acetic acid and vaporized entraining liquid. The entraining liquid entering the dephlegmator 2 will be vaporized by the latent heat developed by the condensation of the tar, wood oils and higher acids.

The tar, wood oils and higher acids which are condensed in the dephlegmator 2 by the stream or reflux of the entraining liquid will usually contain a small amount of water and acetic acid. The amount of the entraining liquid reflux is so regulated as to condense at least all of the tar, wood oils, and the higher acids with a minimum quantity of water and acetic acid. This mixture containing the impurities flows through the pipe 20 and is introduced into the top of a column 4 which is heated at the bottom by a coil. This column removes from the tar, wood oils and higher acids, any water or acetic acid that may have been returned through the pipe 20 and returns the same in vaporous form to the column 2 through the pipe 21. The tar and wood oils are collected at the bottom of column 4 and discharged through a pipe 22 and the higher acids are drawn off through a pipe 23 and condensed in the cooler 13.

The purified vapors of pyroligneous acid enter the column 3 through the pipe 19 where they meet on the plates of this column a reflux of the entraining or withdrawing liquid which enters the column 3 through a pipe 26 and which dissolves the acetic acid and allows the water vapor to pass upward through the column in azeotropic combination with the entraining liquid. As the vapor passes upward through this column the amount of acid contained therein is proportionately decreased and at the top of the column through a pipe 24 the azeotropic mixture of entraining liquid and water having a minimum boiling point is removed. This is condensed at 3a and 3b and then led through a pipe 25 to a decanter 5. The latter permits the mixture to separate into two distinct layers. The entraining liquid flows back through the pipe 26 to the top of the column 3 and the water flows through the pipe 26a to the top of column 9 in which there is removed the small amount of entraining liquid (usually less than 2 or 3%) which is dissolved in a water. This entraining liquid is recovered by causing steam to bubble through it at the bottom of the column 9 and the recovered vapors of entraining agent flow through the pipe 27 and into the vapors exiting from the column 3 in the pipe 24. The water is drawn off at the bottom of column 9 through a pipe 28. This water will contain usually less than .03% acetic acid and chiefly formic acid.

The liquid at the bottom of the column 3 constitutes two distinct layers: a layer of the entraining or withdrawing liquid which is returned through pipe 18 to form the stream or reflux for the dephlegmator 2 as described above, and a layer of aqueous solution of acetic acid, the strength of which is not over 45%. The concentration of the acetic acid is not permitted to exceed this figure and as a consequence the acid and the entraining liquid will separate in distinct layers, and also only a small amount of entraining liquid will be dissolved in the acetic acid.

The acid solution is drawn off through a pipe 29 and introduced into the top of the column 6 heated at the bottom by a steam coil. In this column the acid is dehydrated by rectification and the vapors in the column which are poorer in acid than the liquid in pipe 29 are sent back to the column 3 through pipe 30. Any entraining liquid dissolved in the acid and returning to the column 6 is vaporized in the upper portion of this column. A thermostatic regulator 6a actuated at one of the plates of column 6 controls the heat applied at the bottom of the column. This is usually controlled so that the temperature is around 108° C. near the middle of the column. The concentrated acetic acid in the form of vapors at the bottom of column 6 or a few plates above is removed through a pipe 31 and condensed in the cooler 7. This acid is substantially anhydrous and colorless and is the so-called technical acetic acid which is suitable for most industrial purposes. It will contain a small amount of formic acid but only traces of higher acids.

In order to avoid accumulation in the bottom of the column 6 of certain impurities which are but slightly volatile and which would form resins on the heating coil, a small quantity of the liquid is withdrawn through a pipe 32 and a greater part of this liquid is vaporized in the heater 8 which sends its vapors back to the column 6 through pipe 33. The impurities are discharged through the pipe 34 to the tar column 4.

If a so-called "tasteful" (edible) acetic acid is desired, the vapors are sent from the bottom of the column 6 through a pipe 35 to the bottom of the rectifying column 11, the reflux of which returns to the column 6 through the pipe 36. At the bottom of column 11 an acetic acid which is rich in formic acid is withdrawn through the pipe 37. The pure acid is withdrawn through the pipe 38 from a plate located near the top of the column. This acid is sent to the top of column 12 which removes an additional quantity of formic acid from the product and sends the formic acid vapors through a pipe 39 to the column 11. The "tasteful" acetic acid is taken from the base of the column 12 through a pipe 40 and this acid is condensed in a cooler 14.

The entraining liquid may become slightly modified during use and it is advantageous to eliminate the products in the entraining liquid which would progressively increase the steam consumption. To accomplish this, a small quantity of the entraining liquid is drawn off through a pipe 41 and introduced into a rectifying column 10 heated by a steam coil. The impurities pass to the condenser 10a through a pipe 42 and the purified entraining liquid is returned from the bottom of the column 10 through pipes 43 and 43a to the dephlegmator 2.

The tars issuing from the still 1 and from the bottom of the column may advantageously be submitted to a steam carry-off treatment to recover an aqueous acid therefrom which is recycled into the apparatus.

The de-alcoholized pyroligneous acid may be decanted preparatorily and the tar treated separately yields an aqueous acid which is added to the aqueous pyroligneous acid layer submitted to distillation in the still 1; however, the pyroligneous acid may also be distilled together with its tar without inconvenience.

It is advantageous to preparatorily free the pyroligneous acid from its wood alcohol content.

The dephlegmator 2 utilizes part of the entraining liquid which is recycled automatically as a result of the dehydration. An adjustment of the amounts thus recycled into the dephlegmator 2 will suffice to keep the concentration of the aqueous phase streaming towards 6 from exceeding a definite limit.

It will be appreciated that the purification is costless as far as heat is concerned, because the heat required to vaporize the entraining liquid in the dephlegmator 2 is provided by the condensation of the tar, wood oils and higher acids.

The entraining liquid lends itself to high-temperature decantation (89° C.): the connections from the decanter to the condenser make it possible, whereby the expenditure at the bottom of columns 4 and 6 is limited to the mere vaporization of the entraining liquid decanted at 5. Where "tasteful" acetic acid is produced it is suitable to heat the recovery column 9 with the aid of column 11 from the top of which the vapours issue at about 107° C.; the columns 12 and 9 may also be arranged above each other, so that some steam may be spared.

In no instance the expenditure to obtain "tasteful" acid will be higher than twice the steam necessary to vaporize the pyroligneous acid, even if the concentration of the same should be as high as 15 per cent.

It is unimportant that the pyroligneous acid is taken in at the bottom of column 2 in the liquid instead of the vapour phase; it is only necessary then to suitably design the heater for column 4, in order that the pyroligneous acid may be in the vapor phase when it is contacted with the entraining liquid in the dephlegmator 2.

The use of the butyl acetate-xylol mixture as mentioned above is not limitative and the principle of the invention is not modified by the use of any other suitable mixture. An oxygen-containing substance and a hydrocarbon will preferably be chosen; for instance, a mixture of mesityl oxide with a petrol boiling from about 125 to 135° C. is quite suitable.

The expression "entraining liquid" used herein refers to a stable, non-reactive liquid or mixture of liquids having the property of forming an azeotropic mixture with water in the presence of acetic acid. The materials suitable for this purpose are well known in the prior art and the requirements for such an entraining liquid are set forth in detail in French Patent No. 622,680.

Generally speaking, the oxygen-containing substance imparts solving properties to the auxiliary mixture, while the hydrocarbon will decrease said properties somewhat at the same time as they will allow it to remain not very soluble in the concentrated acid present at the bottom of 3.

I claim:

1. In a process for the separation of a substantially pure anhydrous acetic acid from de-alcoholized pyroligneous acid from which the bulk of the tar has been removed, the steps which comprise contacting said pyroligneous acid in a vapor phase with a water entraining liquid introduced as a reflux and controlled in amount to condense the wood oils, higher acids, and remaining tar contained therein and simultaneously to vaporize said entraining liquid by the latent heat of vaporization given up by the condensed products, and contacting the purified vapors with an additional quantity of the same entraining liquid to dehydrate the acid by azeotropic distillation, the said entraining liquid being one adapted to form with water an azeotrope of minimum boiling point.

2. In a process for the separation of a substantially pure anhydrous acetic acid from de-alcoholized pyroligneous acid the steps which comprise vaporizing the pyroligneous acid to eliminate the bulk of the tar, contacting said pyroligneous acid in a vapor phase with a water entraining liquid introduced as a reflux and controlled in amount to condense the wood oils, higher acids, and remaining tar contained therein and simultaneously to vaporize said entraining liquid by the latent heat of vaporization given up by the condensed products, and contacting the purified vapors with an additional quantity of the same entraining liquid to dehydrate the acid by azeotropic distillation, the said entraining liquid being one adapted to form with water an azeotrope of minimum boiling point.

3. In a process for the separation of a substantially pure anhydrous acetic acid from de-alcoholized pyroligneous acid the steps which comprise vaporizing the pyroligneous acid to eliminate the bulk of the tar, contacting said pyroligneous acid in a vapor phase with a water entraining liquid introduced as a reflux and controlled in amount to condense the wood oils, higher acids, and remaining tar contained therein and simultaneously to vaporize said entraining liquid by the latent heat of vaporization given up by the condensed products, and contacting the purified vapors with an additional quantity of the same entraining liquid to dehydrate the acid by azeotropic distillation, the entraining liquid used in the condensation of the impurities being obtained from a point in the dehydrating operation and being one adapted to form with water an azeotrope of minimum boiling point.

4. In a process for the separation of a substantially pure anhydrous acetic acid from de-alcoholized pyroligneous acid the steps which comprise vaporizing the pyroligneous acid to eliminate the bulk of the tar, contacting said pyroligneous acid in a vapor phase with a water entraining liquid introduced as a reflux and controlled in amount to condense the wood oils, higher acids, and remaining tar contained therein and simultaneously to vaporize said entraining liquid by the latent heat of vaporization given up by the condensed products, and contacting the purified vapors with an additional quantity of the same entraining liquid to dehydrate the acid by azeotropic distillation, the entraining liquid used in the condensation of the impurities being obtained from a point in the dehydrating column and being one adapted to form with water an azeotrope of minimum boiling point.

5. The process described in claim 2 in which the entraining liquid comprises a mixture of butyl acetate and xylol.

6. The process described in claim 2 in which the entraining liquid comprises a mixture of mesityl oxide and a petrol boiling from 125° to 135° C.

CHARLES COUTOR.